United States Patent
Fan et al.

(10) Patent No.: US 12,197,937 B2
(45) Date of Patent: Jan. 14, 2025

(54) AUTOMATED APPLICATION TIERING AMONG CORE AND EDGE COMPUTING SITES

(71) Applicant: Dell Products L.P., Round Rock, TX (US)

(72) Inventors: Huijuan Fan, Chengdu (CN); Biao Yan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 594 days.

(21) Appl. No.: 17/524,356

(22) Filed: Nov. 11, 2021

(65) Prior Publication Data

US 2023/0123841 A1    Apr. 20, 2023

(30) Foreign Application Priority Data

Oct. 20, 2021   (CN) .......................... 202111223891.3

(51) Int. Cl.
   *G06F 9/455*    (2018.01)
   *G06F 9/50*     (2006.01)

(52) U.S. Cl.
   CPC .......... *G06F 9/45558* (2013.01); *G06F 9/505* (2013.01); *G06F 9/5072* (2013.01); *G06F 2009/4557* (2013.01); *G06F 2009/45595* (2013.01)

(58) Field of Classification Search
   CPC ................................................ G06F 9/45558
   USPC ......................................................... 718/1
   See application file for complete search history.

(56) References Cited

U.S. PATENT DOCUMENTS

| | | | | |
|---|---|---|---|---|
| 8,776,074 B1 * | 7/2014 | Heisler | ................. | G06F 9/4881 |
| | | | | 718/103 |
| 11,307,914 B2 * | 4/2022 | Jin | ............................ | G06F 8/61 |
| 11,327,806 B1 * | 5/2022 | Nagaraja | ............... | G06F 9/5077 |
| 11,917,230 B2 * | 2/2024 | Zeng | ..................... | H04W 28/06 |
| 2013/0346465 A1 * | 12/2013 | Maltz | .................... | G06F 9/5072 |
| | | | | 709/201 |

(Continued)

OTHER PUBLICATIONS

Google, "Hybrid and Multi-cloud Architecture Patterns," https://cloud.google.com/architecture/hybrid-and-multi-cloud-architecture-patterns, Sep. 20, 2018, 18 pages.

(Continued)

*Primary Examiner* — Mehran Kamran
(74) *Attorney, Agent, or Firm* — Ryan, Mason & Lewis, LLP

(57) ABSTRACT

An apparatus comprises a processing device configured to obtain information associated with an application and to determine, based at least in part on the obtained information, values associated with metrics characterizing suitability of hosting the application at edge computing sites of an information technology infrastructure. The processing device is also configured to generate, based at least in part on the determined values, a score for the application, and to analyze workload status of the edge computing sites. The at least one processing device is further configured to select, based at least in part on the score for the application and the workload status of the edge computing sites, whether to host the application at a core computing site of the information technology infrastructure or the edge computing sites, and to host the application at the selected one of the core computing site and the edge computing sites.

20 Claims, 13 Drawing Sheets

(56) References Cited

U.S. PATENT DOCUMENTS

| | | | | |
|---|---|---|---|---|
| 2014/0022985 | A1* | 1/2014 | Kalmbach | H04W 88/08 |
| | | | | 370/328 |
| 2015/0199635 | A1* | 7/2015 | Forman | G06Q 10/06315 |
| | | | | 705/7.25 |
| 2015/0245160 | A1* | 8/2015 | Agrawal | H04L 41/145 |
| | | | | 455/406 |
| 2018/0219955 | A1* | 8/2018 | Chen | H04L 41/0896 |
| 2018/0270720 | A1* | 9/2018 | Shi | H04W 36/30 |
| 2018/0300124 | A1* | 10/2018 | Malladi | H04L 12/283 |
| 2018/0368053 | A1* | 12/2018 | Wei | H04W 48/14 |
| 2019/0227843 | A1* | 7/2019 | Custodio | G06F 9/4843 |
| 2020/0267053 | A1* | 8/2020 | Zheng | H04L 41/0823 |
| 2020/0275313 | A1* | 8/2020 | He | H04W 28/0838 |
| 2020/0320397 | A1* | 10/2020 | Liu | H04L 67/34 |
| 2020/0327371 | A1* | 10/2020 | Sharma | H04L 67/562 |
| 2021/0153041 | A1* | 5/2021 | Parvataneni | H04L 43/065 |
| 2021/0258217 | A1* | 8/2021 | Chen | H04L 67/34 |
| 2021/0303410 | A1* | 9/2021 | Lei | G06F 3/0619 |
| 2021/0392163 | A1* | 12/2021 | Tang | H04L 63/1433 |
| 2022/0141761 | A1* | 5/2022 | Cai | H04W 48/14 |
| | | | | 709/222 |
| 2022/0156776 | A1* | 5/2022 | Long | G06Q 30/0215 |
| 2022/0206868 | A1* | 6/2022 | Dreyer | G06F 9/44505 |
| 2022/0318065 | A1* | 10/2022 | Chen | G06F 9/5072 |
| 2022/0398136 | A1* | 12/2022 | Chen | G06F 9/5088 |
| 2022/0417172 | A1* | 12/2022 | Pentakota | H04L 47/803 |
| 2023/0088681 | A1* | 3/2023 | Singh | H04L 41/14 |
| | | | | 709/226 |
| 2023/0123841 | A1* | 4/2023 | Fan | G06F 9/505 |
| | | | | 718/1 |
| 2023/0171305 | A1* | 6/2023 | Amento | H04L 67/63 |
| | | | | 709/223 |
| 2023/0221936 | A1* | 7/2023 | Berra | G06F 11/302 |
| | | | | 717/177 |
| 2023/0305894 | A1* | 9/2023 | Fan | G06N 20/00 |

OTHER PUBLICATIONS

Wikipedia, "Analytic Hierarchy Process," https://en.wikipedia.org/wiki/Analytic_hierarchy_process, Jul. 26, 2021, 15 pages.

M. Bernasconi et al., "The Analytic Hierarchy Process and the Theory of Measurement," Management Science, vol. 56, No. 4, Apr. 2010, pp. 699-711.

O. S. Vaidya et al., "Analytic Hierarchy Process: An Overview of Applications," European Journal of Operational Research, vol. 169, Jul. 15, 2004, pp. 1-29.

* cited by examiner

AUTOMATED APPLICATION TIERING AMONG CORE AND EDGE COMPUTING SITES

RELATED APPLICATION

The present application claims priority to Chinese Patent Application No. 202111223891.3, filed on Oct. 20, 2021 and entitled "Automated Application Tiering Among Core and Edge Computing Sites," which is incorporated by reference herein in its entirety.

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for automated application tiering among core and edge computing sites.

In one embodiment, an apparatus comprises at least one processing device comprising a processor coupled to a memory. The at least one processing device is configured to perform the steps of obtaining information associated with an application and determining, based at least in part on the obtained information, values associated with two or more metrics characterizing suitability of hosting the application at one or more edge computing sites of an information technology infrastructure. The at least one processing device is also configured to perform the steps of generating, based at least in part on the determined values associated with the two or more metrics characterizing suitability of hosting the application at the one or more edge computing sites, a score for the application, and analyzing workload status of the one or more edge computing sites. The at least one processing device is further configured to perform the steps of selecting, based at least in part on the score for the application and the workload status of the one or more edge computing sites, whether to host the application at a core computing site of the information technology infrastructure or the one or more edge computing sites, and hosting the application at the selected one of the core computing site and the one or more edge computing sites.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
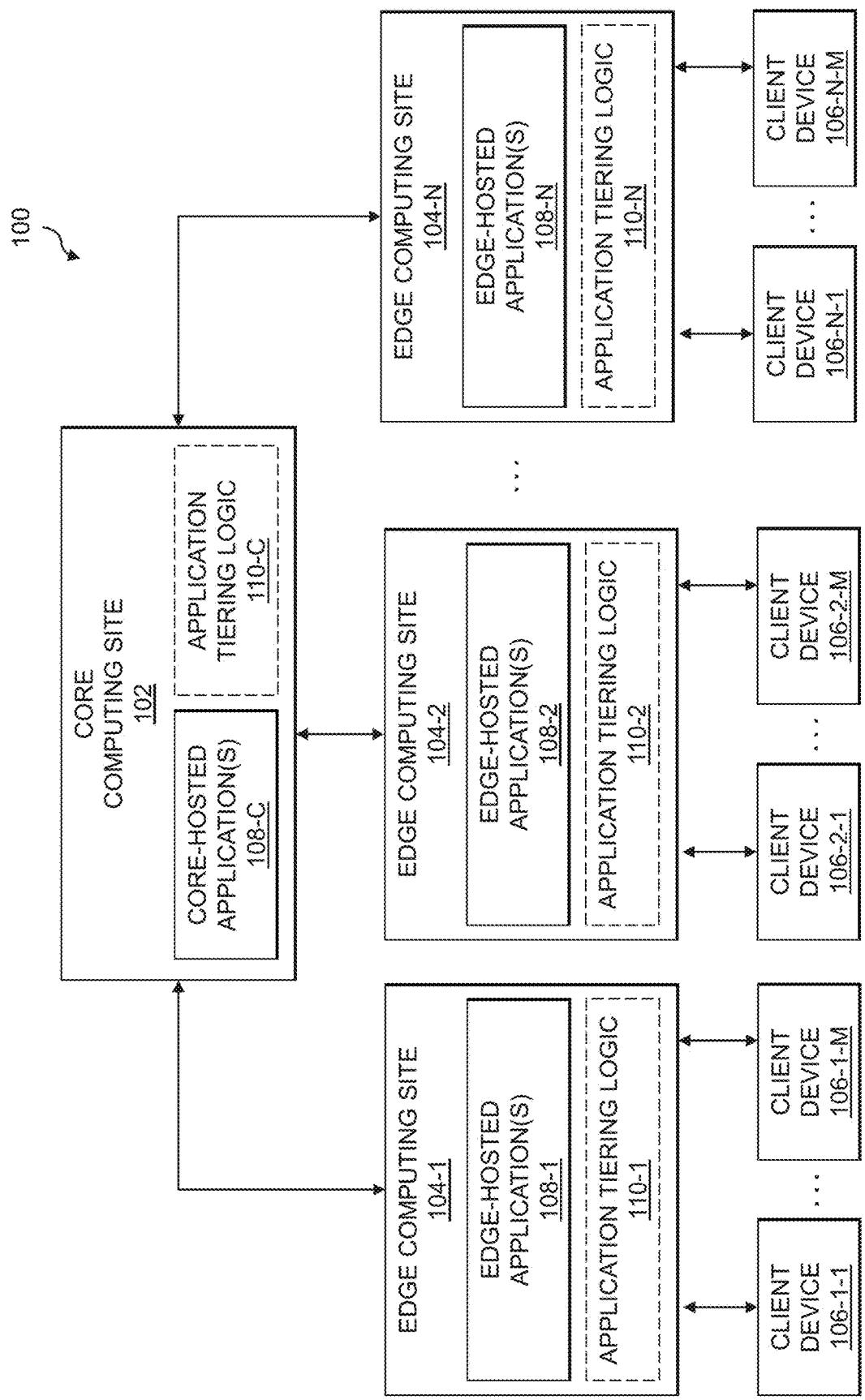
FIG. 1 is a block diagram of an information processing system configured for automated application tiering among core and edge computing sites in an illustrative embodiment.

FIG. 1 shows an information processing system 100 configured in accordance with an illustrative embodiment. The information processing system 100 is assumed to be built on at least one processing platform and provides functionality for automated application tiering among core computing site 102 and a set of edge computing sites 104-1, 104-2, . . . 104-N (collectively, edge computing sites 104). As used herein, the term "application" is intended to be broadly construed to include applications, microservices, and other types of services. The core computing site 102, also referred to as a core data center 102, is assumed to comprise a plurality of core devices or core nodes (not shown in FIG. 1) that run core-hosted applications 108-C. Each of the edge computing sites 104 is also assumed to comprise a plurality of edge devices or edge nodes (not shown in FIG. 1) that run edge-hosted applications 108-1, 108-2, 108-N (collectively, edge-hosted applications 108-E). The core-hosted applications 108-C and edge-hosted applications 108-E are collectively referred to as applications 108.

The information processing system 100 includes a plurality of client devices that are coupled to each of the edge computing sites 104. A set of client devices 106-1-1, . . . 106-1-M (collectively, client devices 106-1) are coupled to edge computing site 104-1, a set of client devices 106-2-1, . . . 106-2-M (collectively, client devices 106-2) are coupled to edge computing site 104-2, and a set of client devices 106-N-1, . . . 106-N-M (collectively, client devices 106-N) are coupled to edge computing site 104-N. The client devices 106-1, 106-2, . . . 106-N are collectively referred to as client devices 106. It should be appreciated that the particular number "M" of client devices 106 that are connected to each of the edge computing sites 104 may be different. In other words, the number M of client devices 106-1 coupled to the edge computing site 104-1 may be the same as or different than the number M of client devices 106-2 coupled to the edge computing site 104-2. Further, a particular client device 102 may be connected or coupled to only a single one of the edge computing sites 104 at any given time, or may be coupled to multiple ones of the edge computing sites 104 at any given time, or may be connected to different ones of the edge computing sites 104 at different times.

The client devices 106 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as virtual machines (VMs), containers, etc.

The client devices 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The networks coupling the client devices 106, the edge computing sites 104 and the core computing site 102 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks. In some embodiments, a first type of network (e.g., a public network) couples the client devices 106 to the edge computing sites 104, while a second type of network (e.g., a private network) couples the edge computing sites 104 to the core computing site 102.

In some embodiments, the core computing site 102 and edge computing sites 104 and core collectively provide at least a portion of an information technology (IT) infrastructure operated by an enterprise, where the client devices 106 are operated by users of the enterprise. The IT infrastructure comprising the core computing site 102 and the edge computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the core computing site 102 and/or the edge computing sites 104. A given enterprise system may host assets that are associated with multiple enterprises (e.g., two or more different businesses, organizations or other entities).

Although not explicitly shown in FIG. 1, one or more input-output devices such as keyboards, displays or other types of input-output devices may be used to support one or more user interfaces to the core computing site 102 and the edge computing sites 104, as well as to support communication between the core computing site 102, the edge computing sites 104, and other related systems and devices not explicitly shown.

As noted above, the core computing site 102 hosts core-hosted applications 108-C and the edge computing sites 104 host edge-hosted applications 108-E, where the core-hosted applications 108-C and the edge-hosted applications 108-E are collectively referred to as applications 108. The client devices 106 send requests to access the applications 108 to the edge computing sites 104 (e.g., to edge computing devices or edge nodes thereof). If a given request from one of the client devices 106 (e.g., client device 106-1-1) is directed to one of the edge-hosted applications 108-1 at the edge computing site 104-1, edge computing devices or edge nodes at the edge computing site 104-1 will service the given request and provide a response (if applicable) to the requesting client device 106-1-1. If the given request is directed to one of the core-hosted applications 108-C, the edge computing devices or edge nodes at the edge computing site 104-1 will forward the given request to the core computing site 102. The core computing site 102 will service the given request, and provide a response (if applicable) back to the edge computing site 104-1, which will in turn provide the response back to the requesting client device 106-1-1.

Different ones of the applications 108 may have different required performance or other characteristics. As a result, it may be more advantageous for certain ones of the applications 108 to be hosted at the core computing site 102 or one or more of the edge computing sites 104, based on the required performance, metrics or other characteristics of the applications 108. Further, the required performance, metrics or other characteristics of the applications 108 may change over time, such that a given application currently hosted on one of the edge computing sites 104 may be better suited for hosting by the core computing site 102, or vice versa. In illustrative embodiments, the edge computing sites 104 and the core computing site 102 implement respective instances of application tiering logic 110-1, 110-2, . . . 110-N and 110-C (collectively, application tiering logic 110). The application tiering logic 110 provides for dynamic allocation of processing locations for the applications 108 at the core computing site 102 and the edge computing sites 104. The application processing location may be set when applications 108 are initiated, and may be refined or dynamically adjusted over time in response to various conditions (e.g., a request from one of the client devices 106 to perform re-balancing, changes in application requirements, periodically, changes in workload or relative workloads of different ones of the edge computing sites 104, etc.).

The application tiering logic 110 is configured to obtain information associated with the applications 108 hosted in an IT infrastructure comprising the core computing site 102 and the edge computing sites 104. The application tiering logic 110 is also configured to determine, based at least in part on the obtained information, values associated with two or more metrics characterizing suitability of hosting the applications 108 at the edge computing sites 104. The application tiering logic 110 is further configured to generate, based at least in part on the determined values associated with the two or more metrics characterizing suitability of hosting the applications 108 at the edge computing sites 104, scores for the applications 108. The application tiering logic 110 is further configured to analyze workload status of the edge computing sites 104, and to select, based at least in part on the scores for the applications 108 and the workload status of the edge computing sites 104, whether to host respective ones of the applications 108 at the core computing site 102 or the edge computing sites 104.

In some embodiments, information associated with the applications 108 (e.g., various metrics) as well as information on load at the edge computing sites 104 may be stored in a database or other data store. The database or other data store may be implemented using one or more of storage systems that are part of or otherwise associated with one or more of the core computing site 102, the edge computing sites 104, the client devices 106. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the core computing site 102 and the edge computing sites 104 in this embodiment, the application tiering logic 110 in other embodiments can be implemented at least in part externally to the core computing site 102 and the edge computing sites 104, for example, as a stand-alone server, set of servers or other type of system coupled via one or more networks to the core computing site 102 and/or the edge computing sites 104. In some embodiments, the application tiering logic 110 may be implemented at least in part within one or more of the client devices 106.

The core computing site 102 and the edge computing sites 104 in the FIG. 1 embodiment are assumed to be implemented using at least one processing device. Each such processing device generally comprises at least one processor and an associated memory, and implements at least a portion of the functionality of the application tiering logic 110.

It is to be appreciated that the particular arrangement of the core computing site 102, the edge computing sites 104, the client devices 106, the applications 108 and the application tiering logic 110 illustrated in the FIG. 1 embodiment is presented by way of example only, and alternative arrangements can be used in other embodiments. As discussed above, for example, the application tiering logic 110 may be implemented external to one or both of the core computing site 102 and the edge computing sites 104. At least portions of the application tiering logic 110 may be implemented at least in part in the form of software that is stored in memory and executed by a processor.

It is to be understood that the particular set of elements shown in FIG. 1 for automated application tiering among the core computing site 102 and the edge computing sites 104 is presented by way of illustrative example only, and in other embodiments additional or alternative elements may be used. Thus, another embodiment may include additional or alternative systems, devices and other network entities, as well as different arrangements of modules and other components.

The core computing site 102, the edge computing sites 104, the client devices 106 and other portions of the system 100, as will be described above and in further detail below, may be part of cloud infrastructure.

The core computing site 102, the edge computing sites 104, the client devices 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The core computing site 102, the edge computing sites 104, and the client devices 106, or components thereof, may be implemented on respective distinct processing platforms, although numerous other arrangements are possible. For example, in some embodiments at least portions of the client devices 106 and the edge computing sites 104 are implemented on the same processing platform. One or more of the client devices 106 can therefore be implemented at least in part within at least one processing platform that implements at least a portion of the edge computing sites 104 and/or the core computing site 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the core computing site 102, the edge computing sites 104 and the client devices 106, or portions or components thereof, to reside in different data centers. Numerous other distributed implementations are possible.

Additional examples of processing platforms utilized to implement the core computing site 102, the edge computing sites 104 and the client devices 106 and other components of the system 100 in illustrative embodiments will be described in more detail below in conjunction with FIGS. 11 and 12.

It is to be appreciated that these and other features of illustrative embodiments are presented by way of example only, and should not be construed as limiting in any way.

Figure 2:
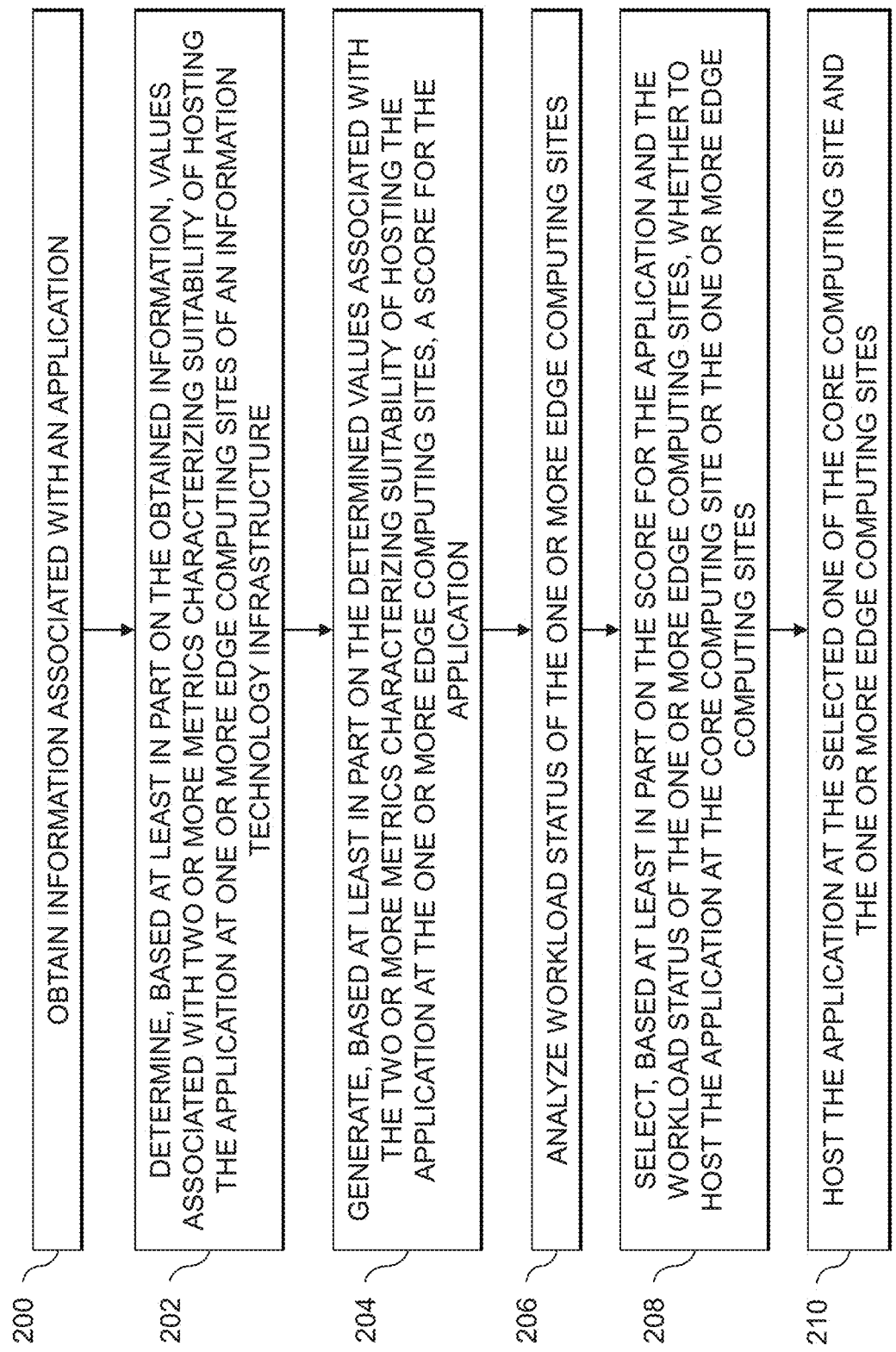
FIG. 2 is a flow diagram of an exemplary process for automated application tiering among core and edge computing sites in an illustrative embodiment.

An exemplary process for automated application tiering among core and edge computing sites will now be described in more detail with reference to the flow diagram of FIG. 2. It is to be understood that this particular process is only an example, and that additional or alternative processes for automated application tiering among core and edge computing sites may be used in other embodiments.

In this embodiment, the process includes steps 200 through 210. These steps are assumed to be performed by the core computing site 102 and the edge computing sites 104 utilizing the application tiering logic 110. The process begins with step 200, obtaining information associated with an application. In step 202, values associated with two or more metrics characterizing suitability of hosting the application at one or more edge computing sites of an information technology infrastructure are determined based on the information obtained in step 200. The two or more metrics may comprise at least two of a time-sensitivity of application data generated by the application, a security of the application data generated by the application, a bandwidth cost associated with the application data generated by the application, and a complexity of the application data generated by the application.

In step 204, a score for the application is generated based at least in part on the determined values associated with the two or more metrics characterizing suitability of hosting the application at the one or more edge computing sites. Step 204 may utilize an analytic hierarchy process algorithm, the analytic hierarchy process algorithm having a goal of determining scores for different types of applications, utilizes the two or more metrics as criteria, and utilizes application types as alternatives. Workload status of the one or more edge computing sites is analyzed in step 206.

A selection is made in step 208 whether to host the application at a core computing site of the information technology infrastructure or the one or more edge computing sites based at least in part on the score for the application and the workload status of the one or more edge computing sites, whether. Step 208 may comprise, responsive to the score for the application being greater than a high watermark threshold, selecting to host the application at the one or more edge computing sites and, responsive to the score for the application being less than a low watermark threshold, selecting to host the application at the core computing site. Step 208 may further comprise responsive to the score for the application being between the high watermark threshold and the low watermark threshold, determining whether the workload status of the one or more edge computing sites exceeds a designated load threshold. Responsive to the workload status of the one or more edge computing sites exceeding the designated load threshold, step 208 may include selecting to host the application at the core computing site. Responsive to the workload status of the one or more edge computing sites being at or below the designated load threshold, step 208 may include selecting to host the application at the one or more edge computing sites.

Step 208 may be repeated in response to detecting one or more designated conditions. The one or more designated conditions may comprise at least one of detecting at least a threshold change in the workload status of the one or more edge computing sites, detecting at least a threshold change in available resources of at least one of the one or more edge computing sites, detecting at least a threshold change in values of at least one of the two or more metrics characterizing suitability of hosting the application at the one or more edge computing sites, etc.

In step 210, the application is hosted at the selected one of the core computing site and the one or more edge computing sites. A determination may be made as to whether the application is currently hosted at the selected one of the core computing site and the one or more edge computing sites. Responsive to determining that the application is not currently hosted at the selected one of the core computing site and the one or more edge computing sites, the application may be migrated to the selected one of the core computing site and the one or more edge computing sites.

Cloud computing provides a number of advantages, including but not limited to playing a significant role in making optimal decisions while offering the benefits of reduced IT costs and scalability. Edge computing provides another option, offering faster response time and increased data security relative to cloud computing. Rather than constantly delivering data back to a core computing site (also referred to herein as a core site, which may be implemented as or within a cloud data center), edge computing enables devices running at edge computing sites (also referred to herein as edge sites) to gather and process data in real-time, allowing them to respond faster and more effectively. Edge sites may also be used with a core site that is implemented as or within a software-defined data center (SDDC), a virtual data center (VDC), etc., where dynamic application processing location and real-time adjustment thereof based on demand or workload at edge sites is desired.

Fortunately, choosing to emphasis edge or cloud computing isn't an "either/or" proposition. As IoT devices are becoming more widespread and powerful, organizations and other entities will need to implement effective edge computing architectures to leverage the potential of this technology. By incorporating edge computing with centralized cloud computing, an entity can maximize the potential of both approaches while minimizing their limitations. Finding the right balance between edge and cloud computing, however, is a major issue for entities that utilize hybrid edge and cloud computing environments. With the right combination of edge and cloud, an entity can see a real return on investment (ROI) and often decreased costs. That said, appropriate tools and computing types will ensure that the entity's data is accurate, costs stay controlled, and operations are protected.

Considering that different applications (and their associated application data) can have different characteristics and requirements, it is difficult for end-users to exactly determine which applications are better to be processed at an edge site or a core site (e.g., a cloud data center). Further, there may be some applications which can only be processed at an edge site, others which can only be processed at a core site, and still others which may be processed at an edge site or the core site depending on the resource situation (e.g., available resources at the edge site). Different edge sites may have different amounts of resources (e.g., compute, storage and network resources). Further, even if two edge sites have the same resources, they may have different associated workload status at different points in time depending on real-time data processing streams.

Therefore, a comprehensive and efficient application processing location evaluation and decision-making method is needed. Illustrative embodiments provide such a solution for application-level processing location decision-making, such as in hybrid edge and cloud computing environments. The solutions described herein evaluate multiple metrics based on different application characteristics, calculate weight rankings for each type of application (or application data) using an Analytic Hierarchy Process (AHP) method, and then determine if a particular application should be processed at an edge site or a core site. In some embodiments, a score or weight ranking for each application is comprehensively evaluated, and then processing locations for the applications are dynamically assigned and located (or relocated) based on real-time processing requirements and current edge site performance or workload status. By adjusting the processing locations for different applications (e.g., between edge sites and a core site), a system can achieve well-balanced resource utilization and more efficient application processing ability. The solutions described herein enable more accurate and suitable application processing location decisions.

Edge sites typically have limited compute and storage resources as compared to a core site (e.g., a cloud data center). End-users want applications to be suitably distributed between the edge sites and the core site on demand to maximize the resources of the edge sites. In some embodiments, a multiple metric evaluation model is used to rank the weight value for each type of application data, and further to determine what types of application to process at edge versus core sites. The higher the weight or score for a particular application (or that application's data), the more likely that application is to be processed at an edge site. To improve the application processing location distribution model's balance and performance, some embodiments take into account the following rules: (1) relatively high ranking applications should be processed at edge sites; and (2) relatively low ranking applications should be processed at the core site.

Various metrics may be used for evaluating application processing requirements and computing resources. In some embodiments, the following metrics are utilized: time-sensitiveness; security; bandwidth cost; complexity; and optional application-specific factors to consider. It should be appreciated, however, that various other metrics may be used in addition to or in place of one or more of these metrics. These metrics will now be described in detail.

Time-sensitiveness of an application or its data refers to how quickly information is needed (e.g., considering the duration when information is needed since it is generated, such as seconds, minutes, hours, etc.). The quicker that information is needed, the less likely such an application or its data should be sent to the core site and the more likely it should be kept at an edge site. For example, driverless car data may be highly time-sensitive.

Security of an application or its data refers to the IT security and reliability that protects computer systems and networks from information disclosure, theft of or damage to their hardware, software, or electronic data, as well as from the disruption or misdirection of the services they provide. Security of an application or its data can also refer to security and reliability with respect to the physical location where computer systems are running (e.g., a building or factory floor's safety as it relates to fire, explosion, razor wire, etc.). The risk of a communications disruption on an offshore drilling rig, for example, may far outweigh the cost benefits of putting all of the necessary computing assets on the platform itself. Security can also relate to privacy, especially for individual IoT devices. While a core site (e.g., a cloud data center) does offer security, the addition of edge computing is often preferred for entities that have major security concerns.

Bandwidth costs refer to the amount of application data that is or is expected to be generated by an application. If a particular application generates huge amounts of data but not all of it is needed for making a sound analysis, then only summary data may need to be sent. For example, wind farms can consist of hundreds of wind-powered turbines generating vast amounts of data. It is impractical to bear the cost of transmitting all of that data to a core site for monitoring the overall health of a wind farm and thus only summary data should be sent (e.g., where such summary data may be determined via processing at edge sites).

Complexity of an application or its data refers to whether the application data is complex enough to have to transfer to the core site (e.g., a cloud data center) for deep mining. This is an important and challenging factor. As an example, an application's data may be analyzed to see whether a few data streams are being examined to solve an immediate problem (e.g., optimizing a conveyer belt) or whether a large number of data streams are being examined to solve a less immediate problem (e.g., comparing thousands of lines across multiple facilities).

As noted above, other optional factors or metrics may be set as specified by particular applications or types of applications.

For a particular use case, an end-user may select some or all of the above-described metrics as desired. Depending on the nature of the analytics in question, some of these metrics may be somewhat correlative, or some may take a higher priority than others. What's more, to a great extent the levels or values of these metrics are dependent on subjective definitions. Thus, it is difficult to compressively evaluate an application and its associated data in a simple way. As such, some embodiments utilize AHP in a complex application location processing decision-making problem.

Figure 3:
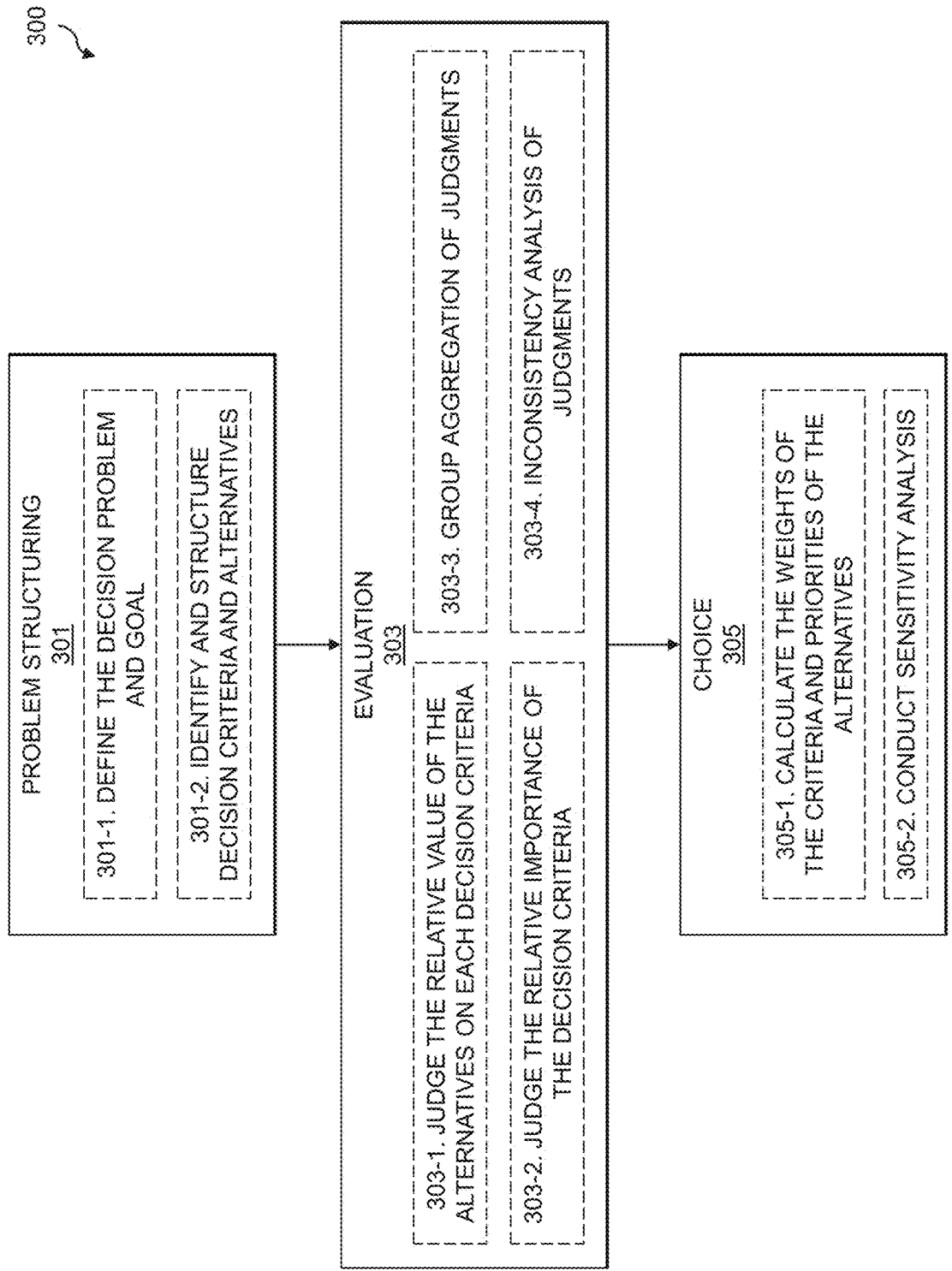
FIG. 3 shows an analytic hierarchy process flow in an illustrative embodiment.

AHP is an effective tool for dealing with complex decision-making. AHP is based on mathematics and psychology, and represents an accurate approach for quantifying the weights of decision criteria. By reducing complex decisions to a series of pairwise comparisons, and then synthesizing the results, AHP helps to capture both subjective and objective aspects of a decision. AHP provides a rational framework for decision-making by quantifying its criteria and alternative options, and for relating those elements to an overall goal. In addition, AHP incorporates a useful technique for checking the consistency of the decision maker's evaluations, thus reducing the bias in the decision-making process. FIG. 3 shows an overview of an AHP process 300, which includes a problem structuring stage 301, an evaluation stage 303 and a choice or decision stage 305. In the problem structuring stage 301, the decision problem and goal are defined in step 301-1, and decision criteria and alternatives are identified and structured in step 301-2. In the evaluation stage 303, the relative values of the alternatives are judged on each decision criterion in step 303-1. In step 303-2, the relative importance of the decision criteria are judged. An aggregation of the judgements in steps 303-1 and 303-2 are grouped in step 303-3, and an inconsistency analysis of such judgments is performed in step 303-4. In the choice or decision stage 305, weights of the criteria and priorities of the alternatives are calculated in step 305-1. In step 305-2, sensitivity analysis is performed.

Figure 4:
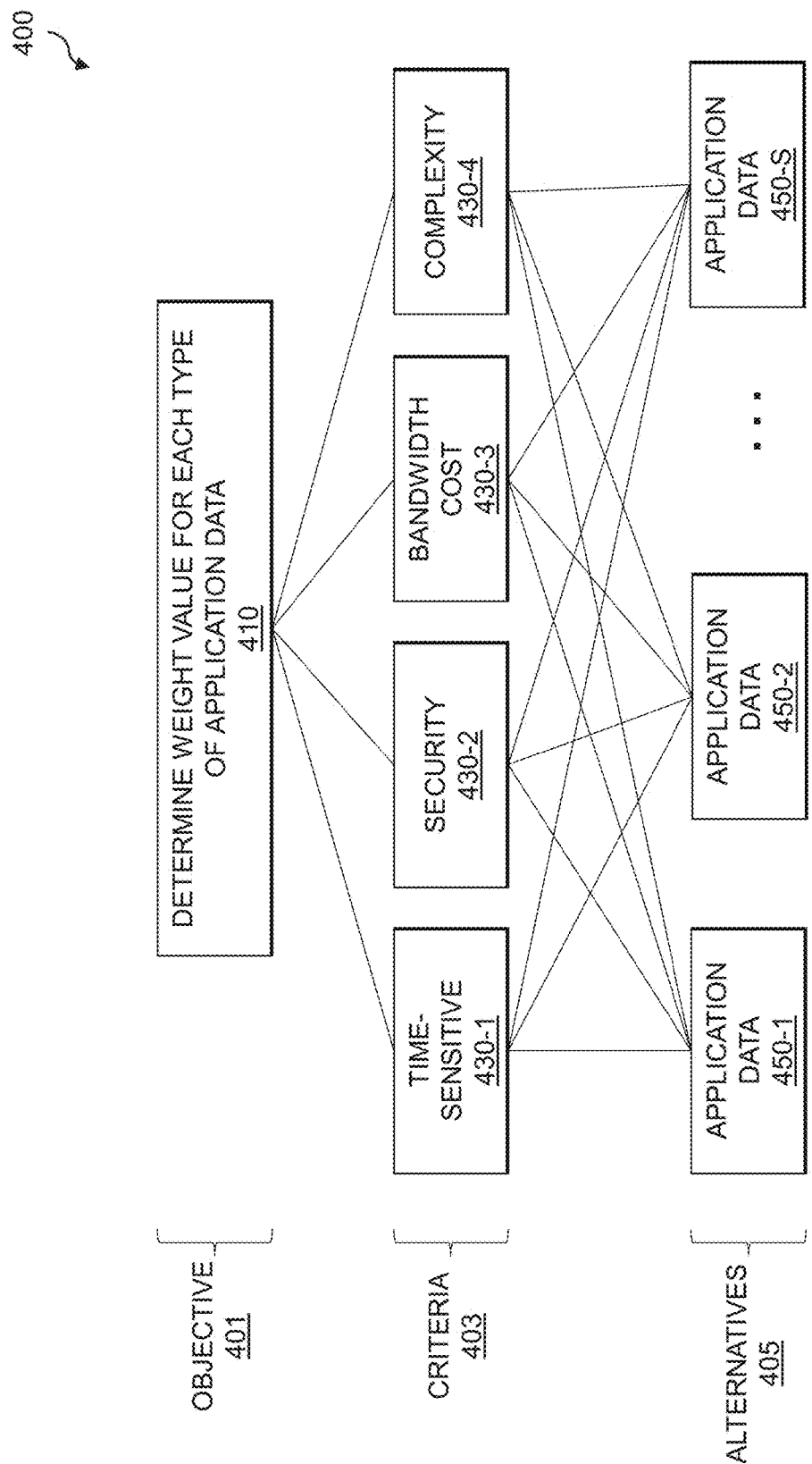
FIG. 4 shows structure of an analytic hierarchy process in an illustrative embodiment.

An AHP process or method includes three parts: the ultimate goal or problem being solved; all of the possible solutions, called alternatives; and the criteria by which the alternatives are to be judged. In some embodiments, the goal is to determine the weight values for each type of application or application data. The criteria includes various metrics, such as those described above (e.g., time-sensitiveness, security, bandwidth cost, complexity, etc.). By refining these in the criteria layer, the system can get a more accurate evaluation. The alternatives are defined as each type of application or application data. Similar to the criteria layer definition, these can be increased or refined according to a desired use case (e.g., by an end-user). FIG. 4 shows an AHP problem structure 400 utilized for an application processing location decision-making evaluation. The objective 401 is to determine weight values for each type of application or application data 410. The criteria 403 include time-sensitiveness 430-1, security 430-2, bandwidth cost 430-3 and complexity 430-4. The alternatives including application data 450-1, application data 450-2, ... application data 450-S.

Figure 5:
FIG. 5 shows a table of relative importance scores for elements in an analytic hierarchy process in an illustrative embodiment.

During AHP evaluation, a vector of criteria weights and a matrix of alternative scores are computed and consistency is also checked. The weights and scores and the final ranking are obtained on the basis of pairwise relative evaluations of both the criteria and the options provided by the end-user. Suppose matrix A is an m×m real matrix, where m is the number of evaluation criteria/alternatives considered. Each entry $a_{jk}$ of the matrix A represents the importance of the $j^{th}$ element relative to the $k^{th}$ element. If $a_{jk}>1$, then the $j^{th}$ element is more important than the $k^{th}$ element, while if $a_{jk}<1$, then the $j^{th}$ element is less important than the $k^{th}$ element. If two elements have the same importance, then the entry $a_{jk}$ is 1. The entries $a_{jk}$ and $a_{kj}$ satisfy the following constraint: $a_{jk} \cdot a_{kj}=1$. $a_{jj}=1$ for all j. The relative importance between two elements is measured according to a numerical scale from 1 to 9, as shown in table 500 of FIG. 5. It should be noted that the particular range (e.g., 1 to 9) and associated interpretations shown in the table 500 of FIG. 5 are presented by way of example only. In other embodiments, a different range may be used, and different portions of that range may be associated with different interpretations. The ranges may in general show slight inconsistencies. However, these do not cause serious difficulties for the AHP. By implementing AHP method based on the pairwise evaluations, the vector of criteria weights and matrix of alternative scores can be computed and also checked for consistency. The weight value ω of each alternative is then calculated to obtain the final ranking for each type of application or application data.

Based on the AHP process 300 and AHP structure 400 described above, an application data processing location decision-making algorithm can be developed. Given N types of application data, the first step is to determine the factual evaluation metrics needed, and the AHP method is used to calculate a weight value ω ranking for each type of application data. Next, the weight value ω of each type of application data is compared with an acceptable threshold value denoted Φ. If ω≥Φ, applications with that type of application data are processed locally at an edge site. Otherwise, that application's data is transferred and processed at a core site (e.g., a remote cloud data center). The particular value of Φ may be selected as desired. In some embodiments, Φ is set to 0.5.

Figure 6:
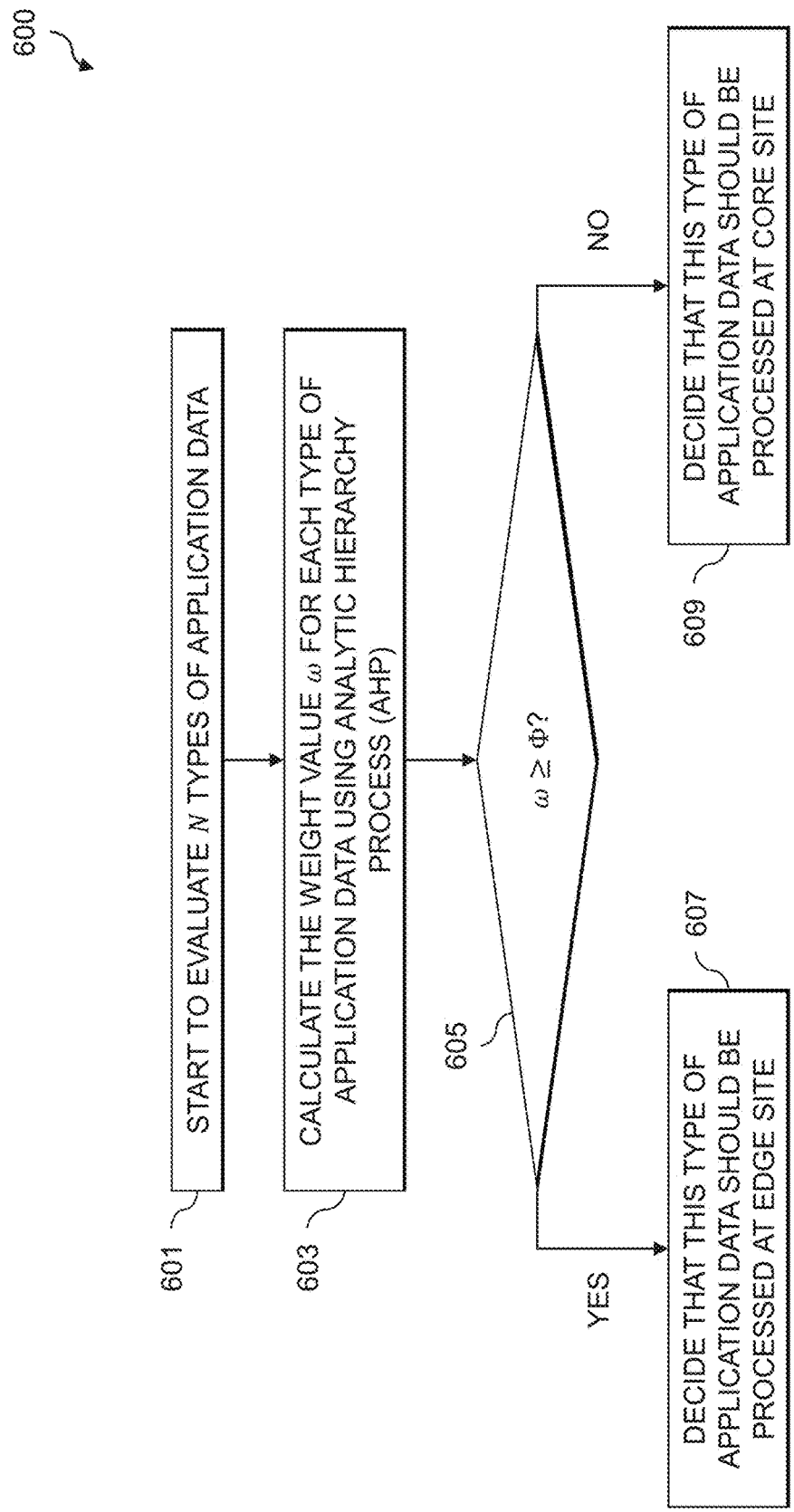
FIG. 6 shows a workflow for an application data processing location decision-making algorithm in an illustrative embodiment.

FIG. 6 shows a workflow 600 for an application data processing location decision-making algorithm. In step 601, the process starts to evaluate N types of application data. In step 603, the weight value ω for each type of application data is calculated using AHP. In step 605, a determination is made as to whether ω≥Φ. If the result of step 605 determination is yes (e.g., for a particular type of application data), the workflow 600 proceeds to step 607 where a determination is made to process applications with that type of application data locally at an edge site. If the result of step 605 determination is no (e.g., for a particular type of application data), the workflow 600 proceeds to step 609 where a determination is made to process applications with that type of application data centrally or remotely at a core site (e.g., a cloud data center). It should be appreciated that in some cases, a given application may process multiple different types of application data. In such a case, the weight values ω for each of the different types of application data utilized by the given application may be considered to determine where to process the given application. For example, the weight values ω for the different types of application data may be combined (e.g., averaged, weighted average based on the relative amounts of the different types of application data used or produced by the given application, etc.). As another example, the highest or lowest weight value ω among the different types of application data may be used to determine where to process the given application. Various other examples are possible.

In order to evaluate different applications' requirements (e.g., and to determine whether such applications should be processed at an edge site or a core site), multiple metrics may be defined (e.g., time-sensitiveness, security, bandwidth cost, complexity, etc.) as described above. Such metrics are used to compressively rank the weight value for each application or application type. AHP is used to help accurately quantify the weights of each application, where the higher the weight for an application the more likely it is to be processed at an edge site. The AHP structure 400 described above may be utilized, where the alternatives 405 are applications or application types (rather than application data types). By implementing AHP, some embodiments can obtain a weight value ranking (e.g., in a range [0,1]) for each alternative (e.g., where the alternatives here are assumed to be different applications). The higher the score or weight an application has, the more likely that application is to be processed at an edge site.

In order to ensure that applications can be processed on demand in time with their associated requirements, different ranges may be defined based on weight values assigned to the applications. Table 700 of FIG. 7, for example, illustrates ranges of scores or weight values for applications and their associated processing location selection. In this example, an application with a score or weight value above 0.9 must be processed at an edge site, and an application with a score or weight value below 0.1 must be processed at a core site. Applications with scores between 0.1 and 0.9 may be processed at either an edge site or the core site. This also means that edge sites' computing ability needs to meet at least the >0.9 weighted applications' processing. It should be noted that the particular values given in table 700 are presented by way of example, and that in other embodiments different thresholds may be used for determining which applications should be processed at an edge site versus the core site.

A dynamic score-based application processing location balancing distribution algorithm is utilized to assign and locate (or re-locate) applications between edge sites and the core site. Assume that there are N types of applications, each of which has a score or weight assigned thereto using the techniques described above. Each time a new application comes (e.g., an end-user request to initiate or run a particular application), a score of that application is compared with defined thresholds (e.g., the thresholds specified in table 700 of FIG. 7). If the application's score is above a high watermark threshold (e.g., 0.9), that application is processed at an edge site. If the application's score is below a low watermark threshold (e.g., 0.1), that application is processed at the core site. If the application's score is between the high and low watermark thresholds (e.g., 0.1≤score≤0.9), then edge site performance is evaluated. If the edge site's current performance exceeds an acceptable threshold value θ, this corresponds to the edge site being too busy to process more applications and thus the application will be processed at the core site. If the edge site's current performance is at or below the acceptable threshold value θ, then the edge site is not too busy to process more applications and thus the application will be processed at the edge site. Advantageously, the algorithm will dynamically evaluate and compare real-time performance for current edge site resources, ensuring that high-scoring applications are always efficiently processed at edge sites first while also keeping resource utilization well-balanced among the core and edge sites.

Figure 8:
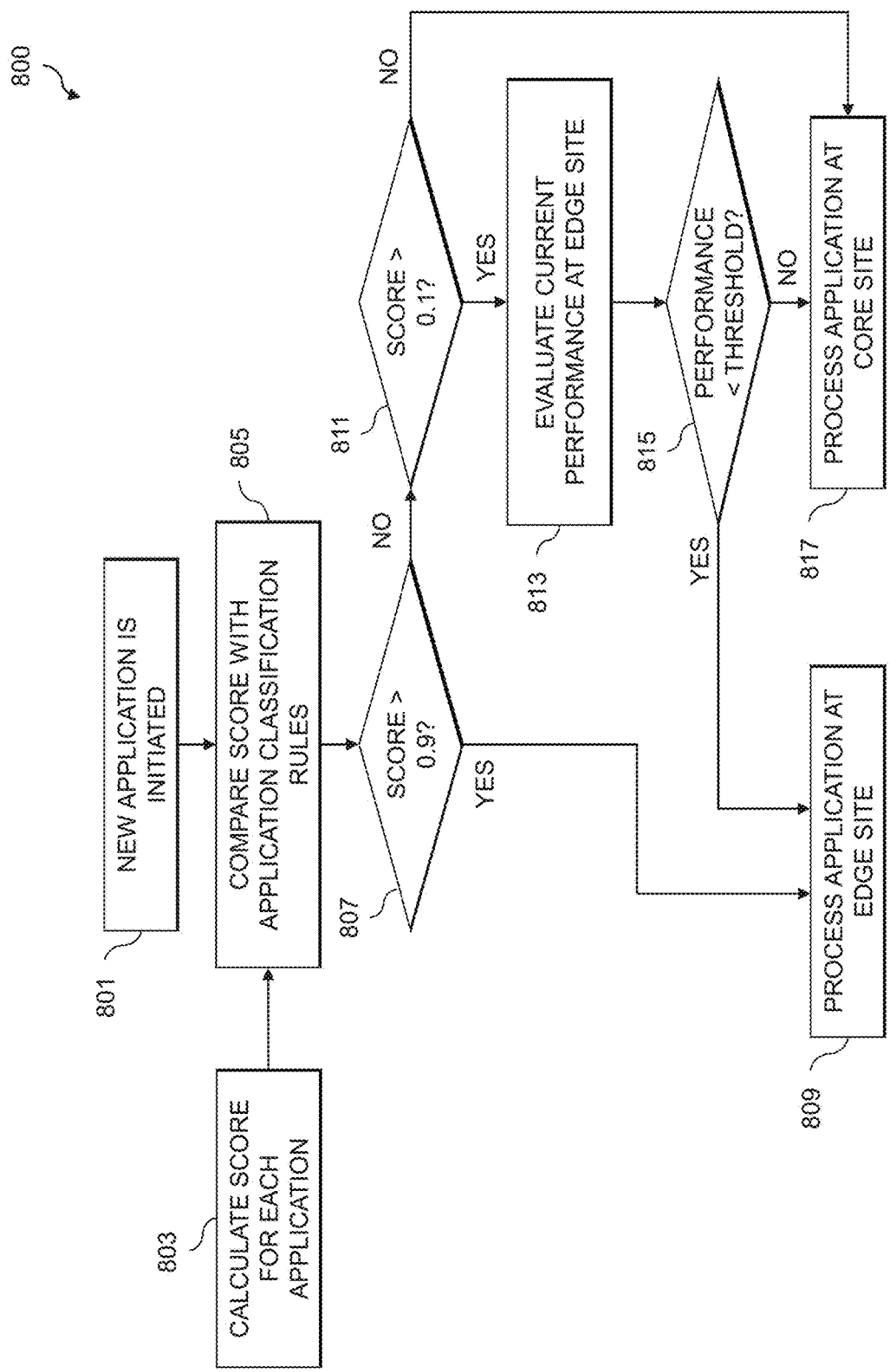
FIG. 8 shows a workflow for an application processing location decision-making algorithm in an illustrative embodiment.

FIG. 8 shows a workflow 800 for an application processing location decision-making algorithm. In step 801, the workflow 800 starts when there is a request to initiate a new application. The request may be submitted by a client device, and the workflow 800 is used to determine whether that new application should be processed at an edge site or a core site. In step 803, a score is calculated for each application or application type. The score for each application or application type may be determined using an AHP algorithm as described above. For example, the types of application data processed by a particular application may be identified, and the score assigned to the application may be determined based at least in part on scores or weights associated to such types of application data. When the application uses two or more different types of application data, the scores or weights associated with the two or more different types of application data may be analyzed to determine an overall score or weight for the application. For example, an average of the scores or weights associated with the two or more different types of application data may be determined. The average may itself be a weighted average, where the weights are based on relative amounts of the different types of application data to be processed by the application. As another example, the highest (or lowest) score or weight associated with the two or more different types of application data may be used as the score or weight for the application. Various other examples are possible. Further, the score or weight for a particular application need not necessarily be based solely on scores or weights of application data types that are processed by an application.

Figure 7:
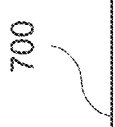
FIG. 7 shows a table of application score ranges and associated processing location selections in an illustrative embodiment.

In step 805, the score for the new application is compared against application classification rules. In FIG. 8, it is assumed that the rules or thresholds specified in table 700 of FIG. 7 are used though it should be noted that various other types of rules and thresholds may be used in other embodiments. In step 807, a determination is made as to whether the score for the new application is greater than the high watermark threshold (e.g., greater than 0.9). If the result of the step 807 determination is yes, the new application is processed at an edge site in step 809. If the result of the step 807 determination is no, a determination is made in step 811 as to whether the score for the new application is greater than the low watermark threshold (e.g., greater than 0.1). If the result of the step 811 determination is yes, processing proceeds to step 813 where the current performance at the edge site is evaluated. In step 815, a determination is made as to whether the current performance at the edge site is less than an acceptable threshold (e.g., 0). If the result of the step 815 determination is yes, then the new application is processed at the edge site in step 809. If the result of either the step 811 determination or the step 815 determination is no, the new application is processed at the core site in step 817.

Figure 9A:
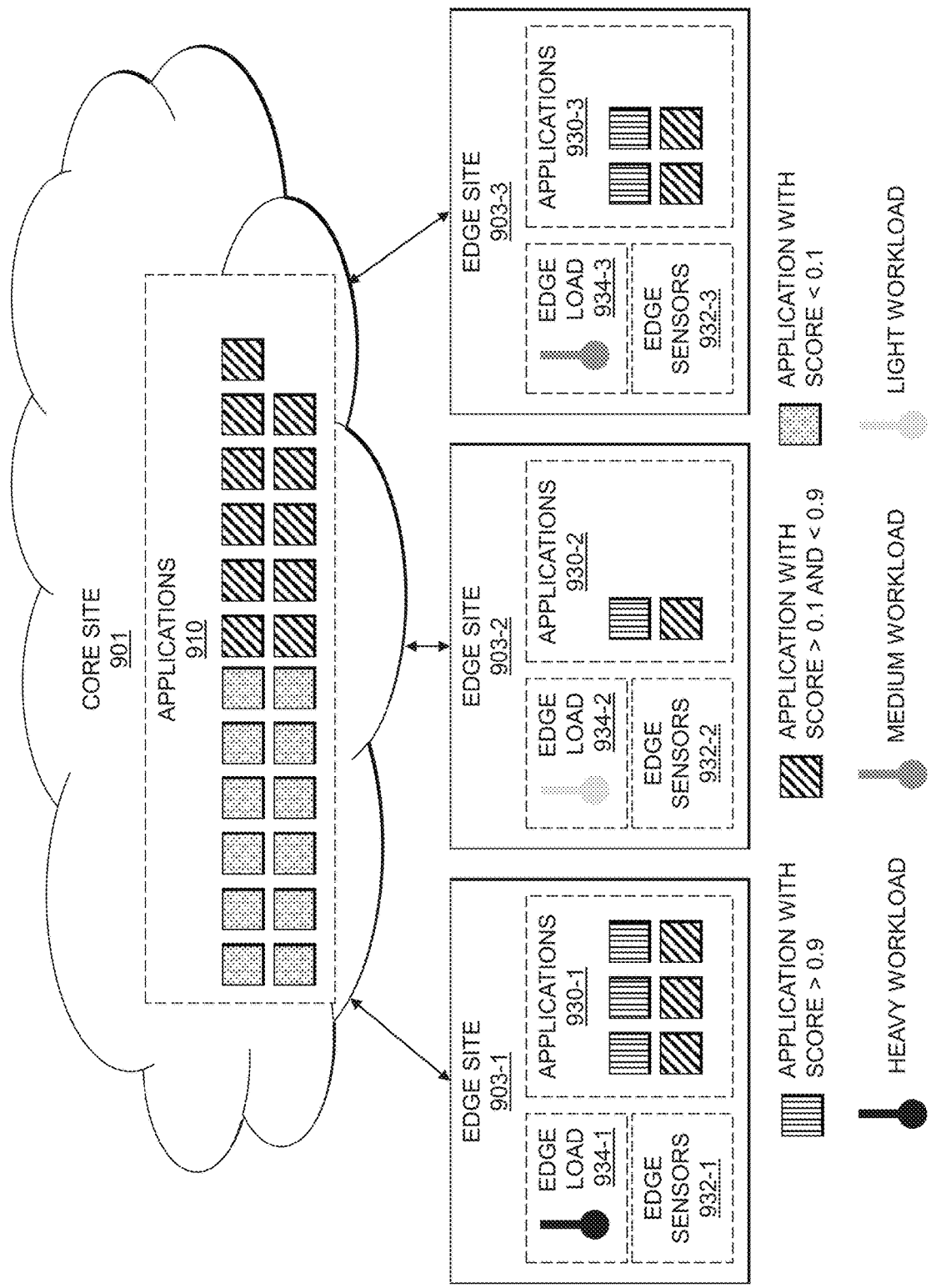
FIGS. 9A and 9B show distribution of applications among edge sites and a core site before and after performance of an application processing location decision-making algorithm in an illustrative embodiment.
Figure 9B:
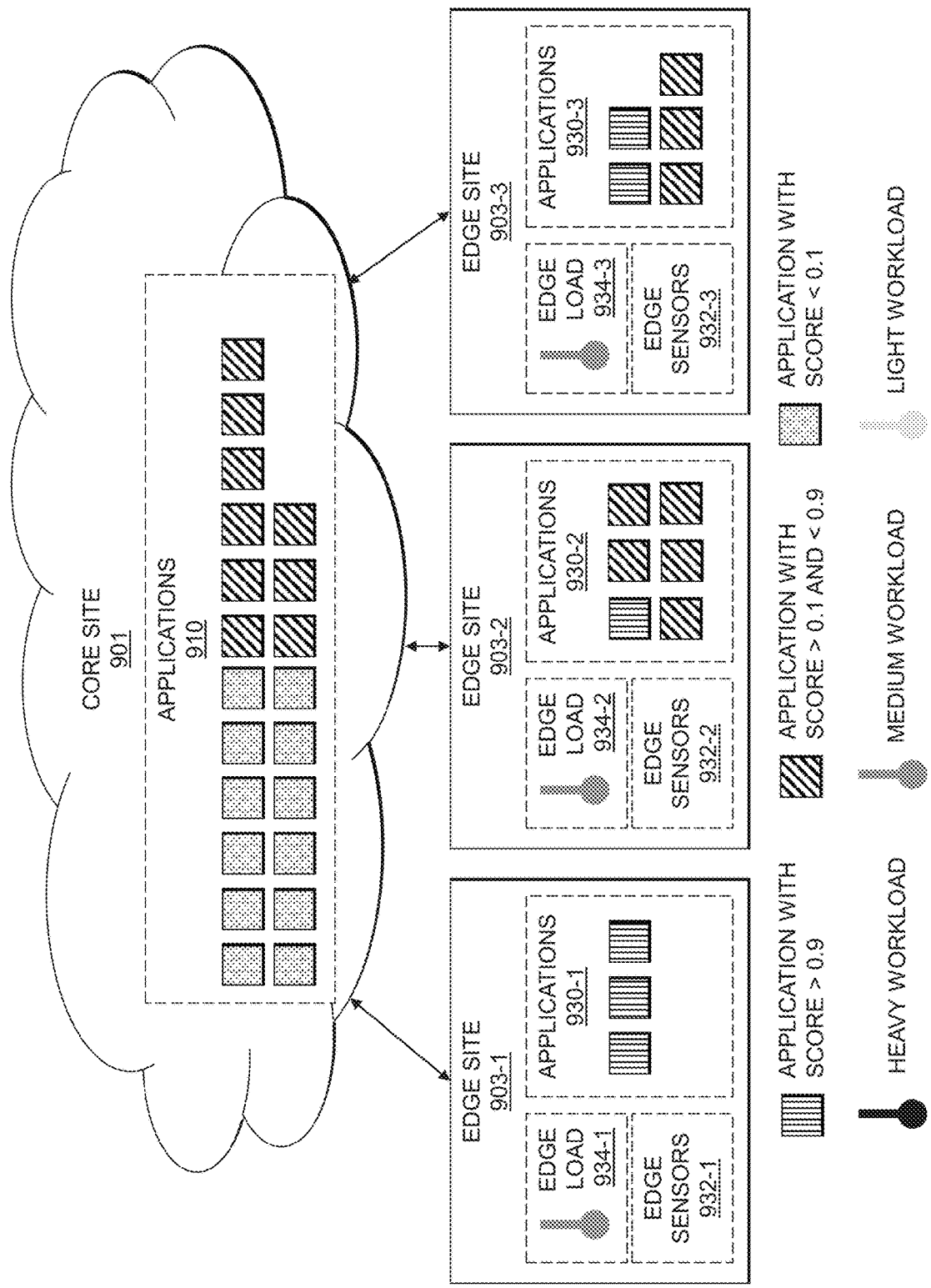

FIGS. 9A and 9B shows examples of distributions of applications among core site 901 (e.g., a cloud data center) and a set of edge sites 903-1, 903-2 and 903-3 (collectively, edge sites 903). It should be noted that the particular number of edge sites 903 is not limited to three—there may be more or fewer than three edge sites in other embodiments. The core site 901 runs a set of applications 910, and the edge sites 903 similarly run sets of applications 930-1, 930-2 and 930-3 (collectively, applications 930). The edge sites 903 are assumed to be associated with respective sets of edge sensors 932-1, 932-2 and 932-2 (collectively, edge sensors 932) and have respective edge workloads 934-1, 934-2 and 934-3 (collectively, edge workloads or edge loads 934). Although shown as being implemented internal to the edge sites 903 in FIGS. 9A and 9B, in other embodiments some or all of the edge sensors 932 may be implemented external to the edge sites 903. Different shading is used to indicate ones of the applications 910 and 930 that have different score ranges, and to indicate the edge loads 934 of the edge sites 903.

FIG. 9A illustrates the case where the applications 910 and 930 are assigned statically based on scores without taking into account current real-time workload status (e.g., edge loads 934). This can lead to undesirable situations, such as that shown in FIG. 9A. The edge site 903-1 has a heavy workload 934-1 and also many applications 930-1 assigned to it. This not only impacts the edge site 903-1, but can also reduce overall system efficiency as resources at the core site 901 may be underutilized. In addition, edge site 903-2 has a light workload 934-2 and relatively few applications 930-2 running thereon (as compared with edge site 903-1). Thus, resources at the edge site 903-2 may be wasted.

FIG. 9B illustrates the case where applications are dynamically assigned to the core site 901 and edge sites 903 according to performance (e.g., edge loads 934) of the edge sites 903. As illustrated, the undesirable situations discussed above with respect to FIG. 9A are advantageously avoided, in that each edge site 903 has a medium edge load 934 and the applications 910 and 930 are provided with an optimal or fastest processing and response.

It should be noted that while the workflow 800 of FIG. 8 is assumed to begin or start in step 801 when a request to initiate a new application is received, the workflow 800 may also be used to periodically or dynamically adjust the processing location of applications (e.g., among core and edge sites) in response to various designated conditions (e.g., periodically, in response to determining that a particular edge site's associated load exceeds some threshold, in response to determining at least a threshold mismatch in load between two or more edge sites, in response to determining under- or over-utilization of resources at a core site or one or more edge sites, etc.). The scores for applications may be used to adjust application processing location according to current edge site performance (e.g., in a recent time period as defined by an end-user). Such scenarios include, but are not limited to: periodically correcting non-optimal assignment of application processing locations as edge site performance changes; re-defining assignment of application processing location when new application requirements are involved (e.g., which can cause application scores or a score distribution to change); re-defining assignment of application processing location as new devices are involved (e.g., where resources are added to or removed from a core site or one or more edge sites, when one or more edge sites are added or removed, etc.) such that edge site load changes.

An example implementation will now be described with respect to an "intelligent" vehicle. An intelligent vehicle application may have to handle multiple scenarios, such as obstacle analysis and determination, obstacle analysis model updates, air conditioner or other component fault handling, etc. Such application scenarios are evaluated and classified according to a set of metrics (e.g., time-sensitiveness, security, bandwidth cost, and complexity) to determine application processing location policies. This is a complex decision-making problem, due in part to: the use of multiple factors with internal correlations that need to be considered; the evaluation tending to be qualitative and subjective; and that exact scores for each application are need to further be used for balancing or migration on demand.

Figure 10:
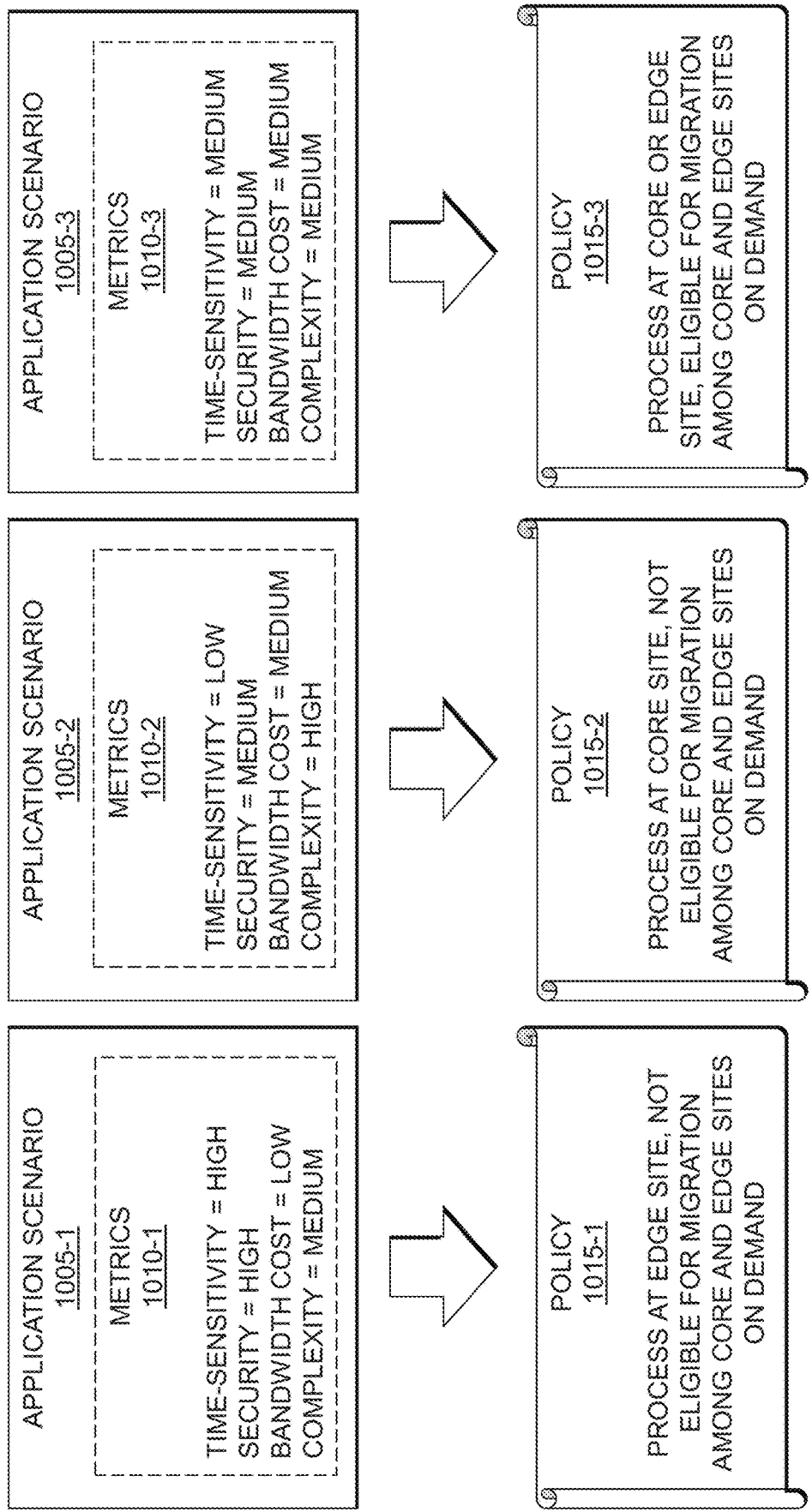
FIG. 10 shows an example of application scenarios and associated processing location placement and migration policies in an illustrative embodiment.

FIG. 10 illustrates the values of such metrics for the different application scenarios 1005-1 (obstacle analysis and determination), 1005-2 (obstacle analysis model updates) and 1005-3 (air conditioner or other component fault handling) with different associated metric values 1010-1, 1010-2 and 1010-3 (e.g., shown as low, medium or high). The different sets of metrics values 1010-1, 1010-2 and 1010-3 for the different application scenarios 1005-1, 1005-2 and 1005-3 lead to the three different policies 1015-1, 1015-2 and 1015-3 shown. AHP can be used to accurately quantify the weights of the decision criteria, where: the weights of multiple metrics are considered; criteria and alternative options are quantified; and a detailed weight ranking of each kind of application or application data is provided. After the application classification, the dynamic score-based application processing location balancing and distribution migration may be performed. In the FIG. 10 example, application scenario 1005-1 has a policy 1015-1 of processing at edge sites, where the application is not eligible for migration among core and edge sites on demand. Application scenario 1005-2 has a policy 1015-2 of processing at the core site, where the application is not eligible for migration among the core and edge sites on demand. Application scenario 1005-3 has a policy 1015-3 of processing at either the core or an edge site, with the application being eligible for migration among the core and edge sites on demand.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated application tiering among core and edge computing sites will now be described in greater detail with reference to FIGS. 11 and 12. Although described in the context of system 100, these platforms may also be used to implement at least portions of other information processing systems in other embodiments.

Figure 11:
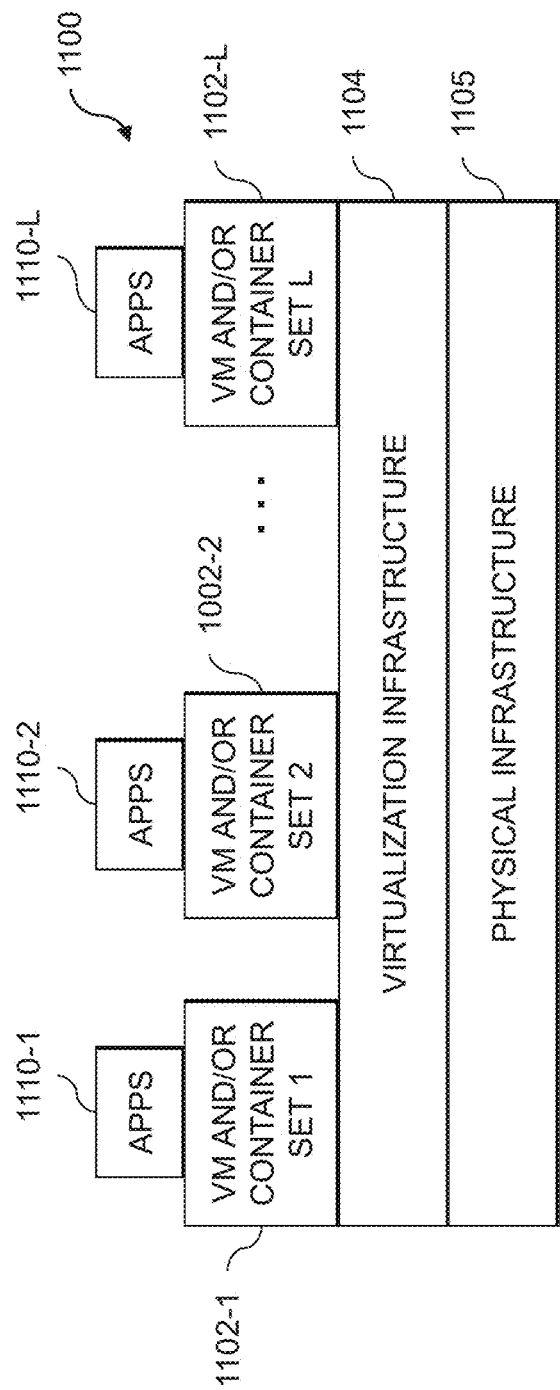
FIGS. 11 and 12 show examples of processing platforms that may be utilized to implement at least a portion of an information processing system in illustrative embodiments.
Figure 12:
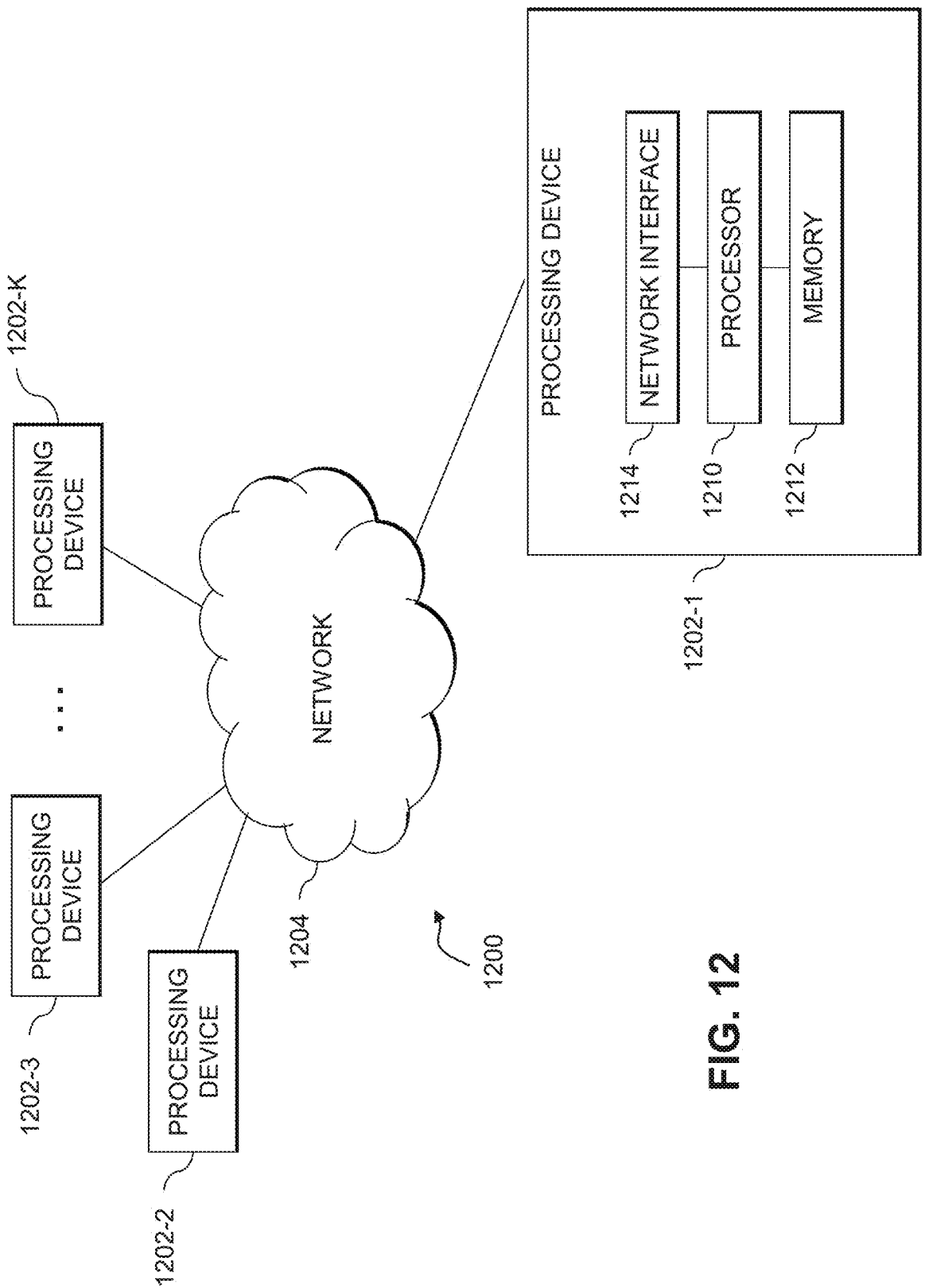

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated application tiering among core and edge computing sites as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, services, parameters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      obtaining information associated with an application;
      determining, based at least in part on the obtained information, values associated with two or more metrics characterizing suitability of hosting the application at one or more edge computing sites of an information technology infrastructure, the two or more metrics comprising (i) a time-sensitivity metric characterizing a time at which application data generated by the application is needed and (ii) a complexity metric characterizing a number of data streams to be processed in the application data generated by the application;
      generating, based at least in part on the determined values associated with the two or more metrics characterizing suitability of hosting the application at the one or more edge computing sites, a score for the application utilizing an analytic hierarchy process algorithm which determines relative weight values for the time-sensitivity metric and the complexity metric;
      analyzing workload status of the one or more edge computing sites;
      selecting, based at least in part on the score for the application and the workload status of the one or more edge computing sites, whether to host the application at a core computing site of the information technology infrastructure or the one or more edge computing sites; and
      hosting the application at the selected one of the core computing site and the one or more edge computing sites.

2. The apparatus of claim 1 wherein the two or more metrics further comprise a security of the application data generated by the application and a bandwidth cost associated with the application data generated by the application.

3. The apparatus of claim 1 wherein the analytic hierarchy process algorithm has a goal of determining scores for different types of applications, utilizes the two or more metrics as criteria, and utilizes application types as alternatives.

4. The apparatus of claim 1 wherein selecting whether to host the application at the core computing site or the one or more edge computing sites comprises:
   responsive to the score for the application being greater than a high watermark threshold, selecting to host the application at the one or more edge computing sites; and
   responsive to the score for the application being less than a low watermark threshold, selecting to host the application at the core computing site.

5. The apparatus of claim 4 wherein selecting whether to host the application at the core computing site or the one or more edge computing sites further comprises, responsive to the score for the application being between the high watermark threshold and the low watermark threshold, determining whether the workload status of the one or more edge computing sites exceeds a designated load threshold.

6. The apparatus of claim 5 wherein selecting whether to host the application at the core computing site or the one or more edge computing sites further comprises, responsive to the workload status of the one or more edge computing sites exceeding the designated load threshold, selecting to host the application at the core computing site.

7. The apparatus of claim 5 wherein selecting whether to host the application at the core computing site or the one or more edge computing sites further comprises, responsive to the workload status of the one or more edge computing sites being at or below the designated load threshold, selecting to host the application at the one or more edge computing sites.

8. The apparatus of claim 1 wherein the at least one processing device is further configured to perform the step of determining whether the application is currently hosted at the selected one of the core computing site and the one or more edge computing sites.

9. The apparatus of claim 8 wherein the at least one processing device is further configured to perform the step of, responsive to determining that the application is not currently hosted at the selected one of the core computing site and the one or more edge computing sites, migrating the application to the selected one of the core computing site and the one or more edge computing sites.

10. The apparatus of claim 1 wherein the at least one processing device is further configured to perform the step of repeating the selection of whether to host the application at the core computing site or the one or more edge computing sites in response to detecting one or more designated conditions.

11. The apparatus of claim 10 wherein the one or more designated conditions comprises detecting at least a threshold change in the workload status of the one or more edge computing sites.

12. The apparatus of claim 10 wherein the one or more designated conditions comprises detecting at least a threshold change in available resources of at least one of the one or more edge computing sites.

13. The apparatus of claim 10 wherein the one or more designated conditions comprises detecting at least a threshold change in values of at least one of the two or more metrics characterizing suitability of hosting the application at the one or more edge computing sites.

14. A computer program product comprising a non-transitory processor-readable storage medium having stored therein program code of one or more software programs, wherein the program code when executed by at least one processing device causes the at least one processing device to perform steps of:
   obtaining information associated with an application;
   determining, based at least in part on the obtained information, values associated with two or more metrics characterizing suitability of hosting the application at one or more edge computing sites of an information technology infrastructure, the two or more metrics comprising (i) a time-sensitivity metric characterizing a time at which application data generated by the application is needed and (ii) a complexity metric characterizing a number of data streams to be processed in the application data generated by the application;
   generating, based at least in part on the determined values associated with the two or more metrics characterizing suitability of hosting the application at the one or more edge computing sites, a score for the application utilizing an analytic hierarchy process algorithm which determines relative weight values for the time-sensitivity metric and the complexity metric;
   analyzing workload status of the one or more edge computing sites;
   selecting, based at least in part on the score for the application and the workload status of the one or more edge computing sites, whether to host the application at a core computing site of the information technology infrastructure or the one or more edge computing sites; and
   hosting the application at the selected one of the core computing site and the one or more edge computing sites.

15. The computer program product of claim 14 wherein selecting whether to host the application at the core computing site or the one or more edge computing sites comprises:
   responsive to the score for the application being greater than a high watermark threshold, selecting to host the application at the one or more edge computing sites; and
   responsive to the score for the application being less than a low watermark threshold, selecting to host the application at the core computing site.

16. The computer program product of claim 15 wherein selecting whether to host the application at the core computing site or the one or more edge computing sites further comprises, responsive to the score for the application being between the high watermark threshold and the low watermark threshold:
   determining whether the workload status of the one or more edge computing sites exceeds a designated load threshold;
   responsive to the workload status of the one or more edge computing sites exceeding the designated load threshold, selecting to host the application at the core computing site; and
   responsive to the workload status of the one or more edge computing sites is at or below the designated load threshold, selecting to host the application at the one or more edge computing sites.

17. A method comprising:
   obtaining information associated with an application;
   determining, based at least in part on the obtained information, values associated with two or more metrics characterizing suitability of hosting the application at one or more edge computing sites of an information technology infrastructure, the two or more metrics comprising (i) a time-sensitivity metric characterizing a time at which application data generated by the application is needed and (ii) a complexity metric characterizing a number of data streams to be processed in the application data generated by the application;
   generating, based at least in part on the determined values associated with the two or more metrics characterizing suitability of hosting the application at the one or more edge computing sites, a score for the application utilizing an analytic hierarchy process algorithm which determines relative weight values for the time-sensitivity metric and the complexity metric;
   analyzing workload status of the one or more edge computing sites;
   selecting, based at least in part on the score for the application and the workload status of the one or more edge computing sites, whether to host the application at a core computing site of the information technology infrastructure or the one or more edge computing sites; and
   hosting the application at the selected one of the core computing site and the one or more edge computing sites;
   wherein the method is performed by at least one processing device comprising a processor coupled to a memory.

18. The method of claim 17 wherein selecting whether to host the application at the core computing site or the one or more edge computing sites comprises:
   responsive to the score for the application being greater than a high watermark threshold, selecting to host the application at the one or more edge computing sites; and
   responsive to the score for the application being less than a low watermark threshold, selecting to host the application at the core computing site.

19. The method of claim 18 wherein selecting whether to host the application at the core computing site or the one or more edge computing sites further comprises, responsive to the score for the application being between the high watermark threshold and the low watermark threshold:
- determining whether the workload status of the one or more edge computing sites exceeds a designated load threshold;
- responsive to the workload status of the one or more edge computing sites exceeding the designated load threshold, selecting to host the application at the core computing site; and
- responsive to the workload status of the one or more edge computing sites is at or below the designated load threshold, selecting to host the application at the one or more edge computing sites.

20. The method of claim 17 further comprising repeating the selection of whether to host the application at the core computing site or the one or more edge computing sites in response to detecting one or more designated conditions.

* * * * *